(12) United States Patent
Beinor et al.

(10) Patent No.: US 11,549,444 B2
(45) Date of Patent: Jan. 10, 2023

(54) HYBRID SEAL DUAL RUNNER

(71) Applicant: Raytheon Technologies Corporation, Farmington, CT (US)

(72) Inventors: Michael A. Beinor, Vernon, CT (US); Timothy J. Castaldo, Wethersfield, CT (US); Christopher M. Valva, Manchester, CT (US); Nasr A. Shuaib, Watertown, MA (US); Mitchell D. Panton, Atlanta, GA (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/168,768

(22) Filed: Feb. 5, 2021

(65) Prior Publication Data

US 2022/0252013 A1 Aug. 11, 2022

(51) Int. Cl.
*F02C 7/28* (2006.01)
*F01D 25/18* (2006.01)
*F02C 7/06* (2006.01)

(52) U.S. Cl.
CPC .............. *F02C 7/28* (2013.01); *F01D 25/183* (2013.01); *F02C 7/06* (2013.01); *F05D 2220/323* (2013.01); *F05D 2240/55* (2013.01); *F05D 2260/232* (2013.01); *F05D 2260/98* (2013.01)

(58) Field of Classification Search
CPC .... F01D 25/183; F01D 25/186; F01D 11/003; F01D 25/125; F02C 7/28; F04D 29/124; F04D 29/102; F16C 33/7816; F16C 33/7859; F16C 33/664; F16C 33/7896; F16J 15/30
See application file for complete search history.

(56) References Cited

U.S. PATENT DOCUMENTS

| 2,971,783 A * | 2/1961 | Laser ................... F16J 15/441 |
| | | 277/408 |
| 3,964,753 A * | 6/1976 | Junker ................... F16J 15/30 |
| | | 277/411 |
| 5,813,830 A | 9/1998 | Smith et al. |
| 7,549,836 B2 * | 6/2009 | Anderson .............. F16J 15/008 |
| | | 415/113 |

(Continued)

FOREIGN PATENT DOCUMENTS

| BE | 405133 A | 10/1934 |
| GB | 444814 A | 3/1936 |
| GB | 445036 A | 4/1936 |

OTHER PUBLICATIONS

European Search Report, 2022 (Year: 2022).*
European Office Action dated Jul. 5, 2022 for European Patent Application No. 20191120.3.

*Primary Examiner* — Eldon T Brockman
(74) *Attorney, Agent, or Firm* — Bachman & LaPointe, P.C.

(57) ABSTRACT

A turbomachine has a bearing in a bearing compartment. A first seal system isolates the bearing compartment and has: a first runner; a second runner; an inner seal encircling the first runner; and an outer seal encircling the second runner. The inner seal has a static clearance with the first runner. The outer seal has a static clearance with the second runner, greater than the inner seal static clearance. The first runner has an inner portion cantilevered inward. The second runner has an outer portion cantilevered outward.

22 Claims, 5 Drawing Sheets

(56) References Cited

U.S. PATENT DOCUMENTS

| | | | |
|---|---|---|---|
| 9,695,940 B2* | 7/2017 | Haynes | F16J 15/442 |
| 10,502,094 B2 | 12/2019 | Shuaib et al. | |
| 2001/0047651 A1 | 12/2001 | Fukutani | |
| 2007/0085278 A1* | 4/2007 | Davis | F04D 29/124 |
| | | | 277/411 |
| 2015/0069712 A1 | 3/2015 | Garrison | |
| 2016/0032765 A1* | 2/2016 | Shuaib | F16C 33/6637 |
| | | | 277/348 |
| 2017/0362949 A1* | 12/2017 | Von Berg | F16J 15/24 |

* cited by examiner

HYBRID SEAL DUAL RUNNER

U.S. GOVERNMENT RIGHTS

This invention was made with Government support. The Government has certain rights in this invention.

BACKGROUND

The disclosure relates to gas turbine engines. More particularly, the disclosure relates to seals for isolating oil-containing bearing compartments.

Gas turbine engines (used in propulsion and power applications and broadly inclusive of turbojets, turboprops, turbofans, turboshafts, industrial gas turbines, and the like) include multiple main bearings (e.g., rolling element bearings—thrust and/or radial) supporting one spool relative to another or relative to grounded structure (e.g. a case).

The bearings are exposed to oil for lubrication and/or cooling. The oil may be passed as a recirculating flow that is passed to the bearings and then collected (scavenged) and ultimately returned to the bearings. To isolate the oil to bearing compartments, each associated with and containing one or more of the bearings, seal systems are used. Example seal systems are carbon seal systems.

To limit oil leakage past the seals, the seals may be buffered by delivering air (e.g., bleed air) to spaces opposite the compartments across the seals so that the compartments are at a lower pressure than the pressurized spaces.

In one group of two-spool engine configurations, a particularly relevant bearing compartment is located radially under the combustor, forward of the high pressure turbine (HPT). The high-pressure buffer air taken from the high pressure compressor (HPC) may pass through a cooler and have its pressure stepped down in one or more stages before entering the bearing compartment. A target delta pressure difference relative to the compartment may be maintained to limit any oil leakage. In one example, a two stage contacting carbon seal allows the required pressure drop. Notwithstanding the pressure difference, some oil will bypass the oil side seal and be evacuated (scuppered) from the interstage. The scuppered oil may be disposed of to prevent fire within the engine. The mixture of buffer air and scuppered oil may be passed to a bypass flowpath or otherwise dumped or may be routed back into the gaspath.

Due to a high thermal gradient across the seal runner and moments caused by operation, there is an increased wear rate on the oil side seal resulting in premature replacement/removal of the seal.

U.S. Pat. No. 10,502,094, Shuaib et al., Dec. 10, 2019, "Bearing compartment sealing system with passive cooling", discloses two-stage seals of hybrid form in that the inner (oil-side) seal is a contacting seal and the outer (air-side) seal is a non-contacting seal.

SUMMARY

One aspect of the disclosure involves a turbomachine comprising a bearing in a bearing compartment. A first seal system isolates the bearing compartment and has: a first runner; a second runner; an inner seal encircling the first runner; and an outer seal encircling the second runner. The inner seal has a static clearance with the first runner. The outer seal has a static clearance with the second runner, greater than the inner seal static clearance. The first runner comprises an inner portion cantilevered inward. The second runner comprises an outer portion cantilevered outward.

In a further embodiment of any of the foregoing embodiments, additionally and/or alternatively, the inner seal static clearance is zero.

In a further embodiment of any of the foregoing embodiments, additionally and/or alternatively, the outer seal static clearance is 0.0010 inch to 0.0050 inch (0.025 to 0.13 mm) radially.

In a further embodiment of any of the foregoing embodiments, additionally and/or alternatively, the inner seal is a non-archbound seal and the outer seal is an archbound seal.

In a further embodiment of any of the foregoing embodiments, additionally and/or alternatively, a circumferential spring biases the inner seal into engagement with the first runner.

In a further embodiment of any of the foregoing embodiments, additionally and/or alternatively, the inner seal is a carbon seal and the outer seal is a carbon seal.

In a further embodiment of any of the foregoing embodiments, additionally and/or alternatively, the inner seal is circumferentially segmented and the outer seal is circumferentially segmented.

In a further embodiment of any of the foregoing embodiments, additionally and/or alternatively, the first runner comprises an inner portion cantilevered inward and the second runner comprises an outer portion cantilevered outward.

In a further embodiment of any of the foregoing embodiments, additionally and/or alternatively, the first runner has a mounting flange and the second runner has a mounting flange abutting the inner portion mounting flange.

In a further embodiment of any of the foregoing embodiments, additionally and/or alternatively, the first runner has a first coefficient of thermal expansion and the second runner has second coefficient of thermal expansion lower than the first coefficient of thermal expansion.

In a further embodiment of any of the foregoing embodiments, additionally and/or alternatively, the turbomachine further comprises an oil source positioned to direct oil to preferentially cool the inner portion relative to the outer portion.

In a further embodiment of any of the foregoing embodiments, additionally and/or alternatively, the turbomachine further comprises a buffer air source introducing air past the outer seal to an interstage.

In a further embodiment of any of the foregoing embodiments, additionally and/or alternatively, the turbomachine further comprises an outlet from the interstage.

A further aspect of the disclosure involves a method for using the turbomachine, the method comprising: driving rotation of a shaft carrying the first runner and the second runner; and passing an airflow between the outer seal and the second runner to mix with an oil leakage flow in an interstage of the seal system.

In a further embodiment of any of the foregoing embodiments, additionally and/or alternatively, the method further comprises directing a cooling oil flow to an inner diameter surface of the first runner inner portion.

In a further embodiment of any of the foregoing embodiments, additionally and/or alternatively, the first runner inner portion thermally deforms to cone inward in the inward direction and the second runner outer portion thermally deforms to cone outward in the outward direction.

A further aspect of the disclosure involves a turbomachine comprising a bearing in a bearing compartment. A first seal system isolates the bearing compartment and has: a runner; an inner seal encircling the runner; and an outer seal encircling the runner. The runner has: a first piece encircled by the inner seal; and a second piece encircled by the outer seal.

In a further embodiment of any of the foregoing embodiments, additionally and/or alternatively, the runner first piece comprises an inner portion cantilevered inward and the runner second piece comprises an outer portion cantilevered outward.

In a further embodiment of any of the foregoing embodiments, additionally and/or alternatively: an oil source is positioned to direct an oil flow to an inner diameter surface of the runner first piece inner portion; and the turbomachine lacks an oil source positioned to direct an oil flow to an inner diameter surface of the runner second piece outer portion.

In a further embodiment of any of the foregoing embodiments, additionally and/or alternatively, the runner first piece has a first coefficient of thermal expansion and the runner second piece has second coefficient of thermal expansion lower than the first coefficient of thermal expansion.

In a further embodiment of any of the foregoing embodiments, additionally and/or alternatively, the runner first piece comprises stainless steel and the runner second piece a molybdenum alloy or a ceramic.

Another aspect of the disclosure involves a turbomachine comprising a bearing in a bearing compartment. A first seal system isolates the bearing compartment and comprises: a first runner; a second runner; an inner seal encircling the first runner; and an outer seal encircling the second runner. The inner seal has a static clearance with the first runner. The outer seal has a static clearance with the second runner, greater than the inner seal static clearance. The turbomachine includes means for preferentially cooling the first runner.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
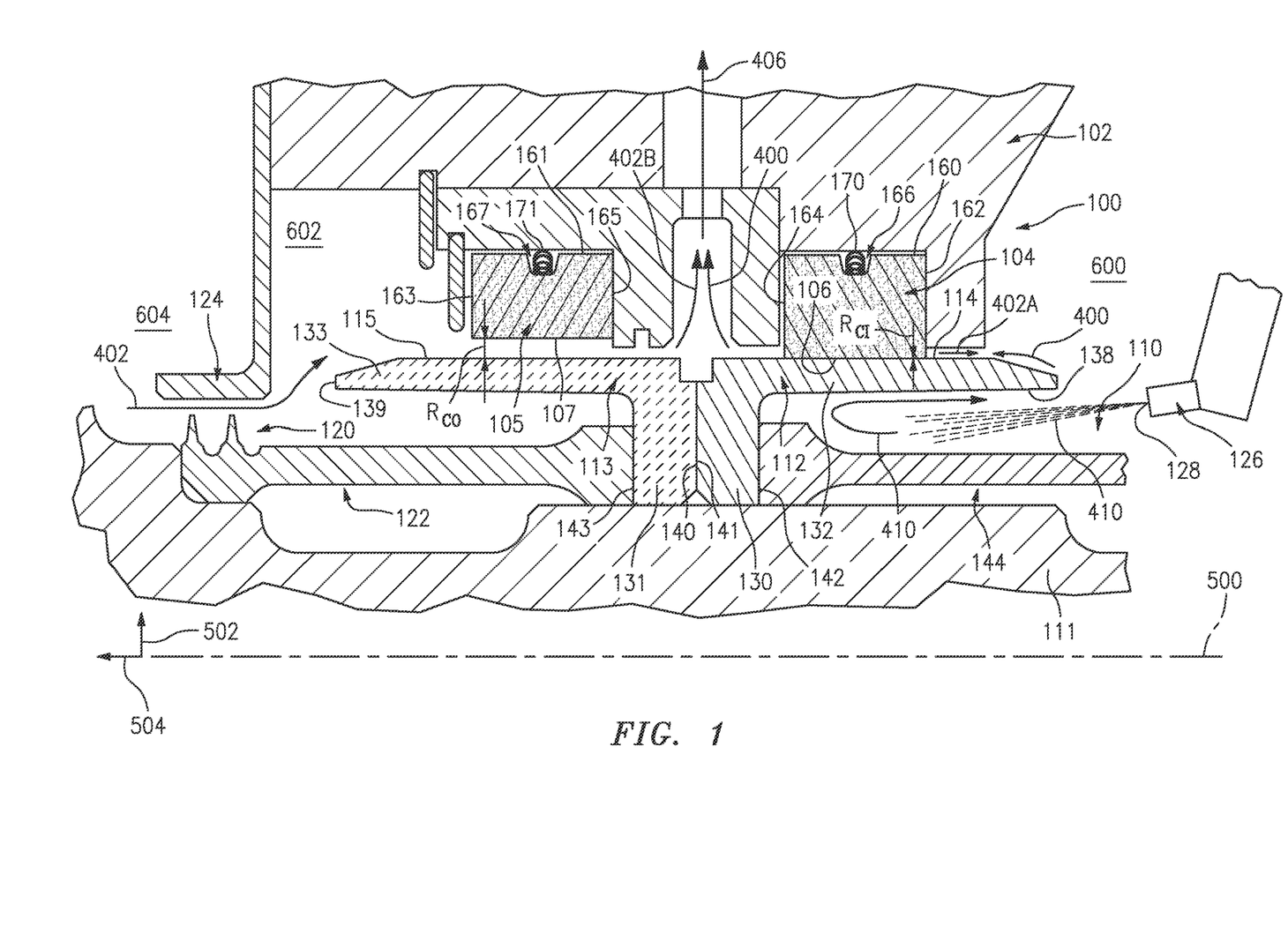
FIG. 1 is a partial partially schematic central axial sectional view of a seal system.

FIG. 1 shows a seal system 100 having a first member 102 carrying a pair of seals 104, 105. As is discussed further below, the seal system is used in a turbomachine such as a gas turbine engine for a purpose such as isolating a bearing compartment. The example seals 104, 105 are carbon seals having an inner diameter (ID) seal surface or face 106, 107. The example seals 104, 105 are each formed as single-piece or segmented body of revolution about an axis 500 which is an axis of relative rotation between the first member 102 and a second member 110. As is discussed further below, in an example implementation, the first member 102 is engine static structure and the second member 110 is a shaft assembly (e.g., of a high spool shaft 111).

FIG. 1 further shows an outward radial direction 502 and a forward direction 504. The second member 110 comprises one or more pieces 112, 113 (runner pieces or just runners) forming runners for the seals 104, 105. The runner pieces have respective outer diameter (OD) surfaces or faces 114, 115 radially facing the respective seal ID surfaces 106, 107. The seals and runners have respective radial clearances labeled $R_{CI}$ and $R_{CO}$.

The seal system 100 isolates a space or volume 600. The example space or volume 600 is a bearing compartment. The example seal system is at a forward end of the bearing compartment. A similar seal system may be at an aft end. The example bearing compartment 600 contains a bearing supporting the second member 110 for rotation relative to the first member 102 about the axis 500. Relative to the bearing compartment 600, the seal 104 is an inner or inboard seal and the seal 105 is an outer or outboard seal.

The example seal system 100 immediately isolates the bearing compartment 600 from a second space or volume 602. The example second space or volume 602 is a buffer chamber which, itself, is separated from a space or volume 604 forward thereof via a seal system 120 (e.g., a knife edge seal system). The example seal system 120 comprises annular knife edges on one end section of a spacer 122 interfacing with an axial sleeve section of a heat shield 124.

As is discussed further below, the bearing compartment 600 contains oil which serves various lubrication and/or cooling functions including bearing lubrication and/or cooling and seal lubrication and/or cooling. Thus, the seal 104 and runner 112 are an oil side seal and runner and the seal 105 and runner 113 are an air side seal and runner. FIG. 1 shows a leakage flow 400 exiting the bearing compartment 600. To limit the leakage flow and direct it for collection, a buffer air flow 402 is introduced passing through the buffer chamber 602. A portion 402A of the buffer air flow may pass into the bearing compartment 600 due to the pressure difference between bearing compartment and interstage (plenum 606 discussed below) of the two-stage seal system 100. The leakage flow merges in the interstage with a remainder 402B of the buffer air flow to form a combined outlet flow or flows 406. The flow(s) 406 may be exhausted to atmosphere and/or combusted. The composition of the flow 406 may vary in operation. For example, there may only be oil in the flow 406 during certain transient conditions of operation, such as engine startup or shutdown, or perhaps if the oil side seal wears and nears the end of life.

In addition to oil delivered to the bearing(s), the flow 400 may further come from oil 410 used for seal cooling and/or lubrication. FIG. 1 shows a nozzle 126 having an outlet 128 spraying oil 410 for cooling the oil side runner 112. There may be a circumferentially-distributed plurality of such nozzles.

Each example runner piece 112, 113 comprises a mounting flange 130, 131 and an axially cantilevered portion 132, 133. The cantilevered portions are cantilevered from the associated flange viewed in section so as to extend to free ends. The cantilevered portion 132 is cantilevered inward into the bearing compartment 600; whereas, the cantilevered portion 133 is cantilevered outward therefrom. The respective flanges have an inner diameter (ID) surface 134, 135. The cantilevered portions extend from junctions with the flanges to distal end surfaces 136, 137 forming respective end rims. The cantilevered portions have respective inner diameter surfaces 138, 139. The flanges have first faces 140, 141 contacting and/or otherwise facing each other (e.g., potentially separated via gasketing, a spacer, or the like). The flanges further have opposite faces 142, 143. The flanges 130,131 are sandwiched between end sections of supports 144, 122 for axial retention and have inner diameter (ID) surfaces in interference engagement with the high spool shaft 111 for rotational capture. The supports, themselves are captured by sections of the high spool shaft 111.

As distinguished from a shared runner with a single compartment to the ID of both seals, the flange structure with opposed cantilever portions isolates cooling of the inner runner 112 from cooling, if any, of the outer runner 113. This allows the oil spray/flow 410 to preferentially cool the inner runner relative to the outer runner.

Exemplary runner materials are alloys (e.g., stainless steel). The two runners may be of different alloys or different materials. For example, the oil side runner may comprise stainless steel and the air side runner may comprise a lower coefficient of thermal expansion (CTE) material such as a molybdenum alloy or a ceramic. An example ceramic is silicon nitride with a CTE about $2\times10\text{-}6/°$ F. versus about $9\times10\text{-}6/°$ F. for many stainless steels. An example CTE of the lower CTE material is 15 to 90 percent that of the higher CTE material, more narrowly 15 to 50 percent for non-metallic air side runners and metallic oil side or 25 to 90 percent if both are metallic.

The carbon seals further comprise outer diameter (OD) surfaces 160, 161, first radial faces 162, 163, and second radial faces 164, 165. The OD surfaces include annular grooves 166, 167 accommodating respective springs and/or seals 170, 171. As is discussed further below, the example springs 170, 171 are full annulus coil springs in tension to hold segments of the seals together. Depending upon implementation, the springs may be unjacketed or may have an elastic tubular jacket that also provides sealing.

Figure 2:
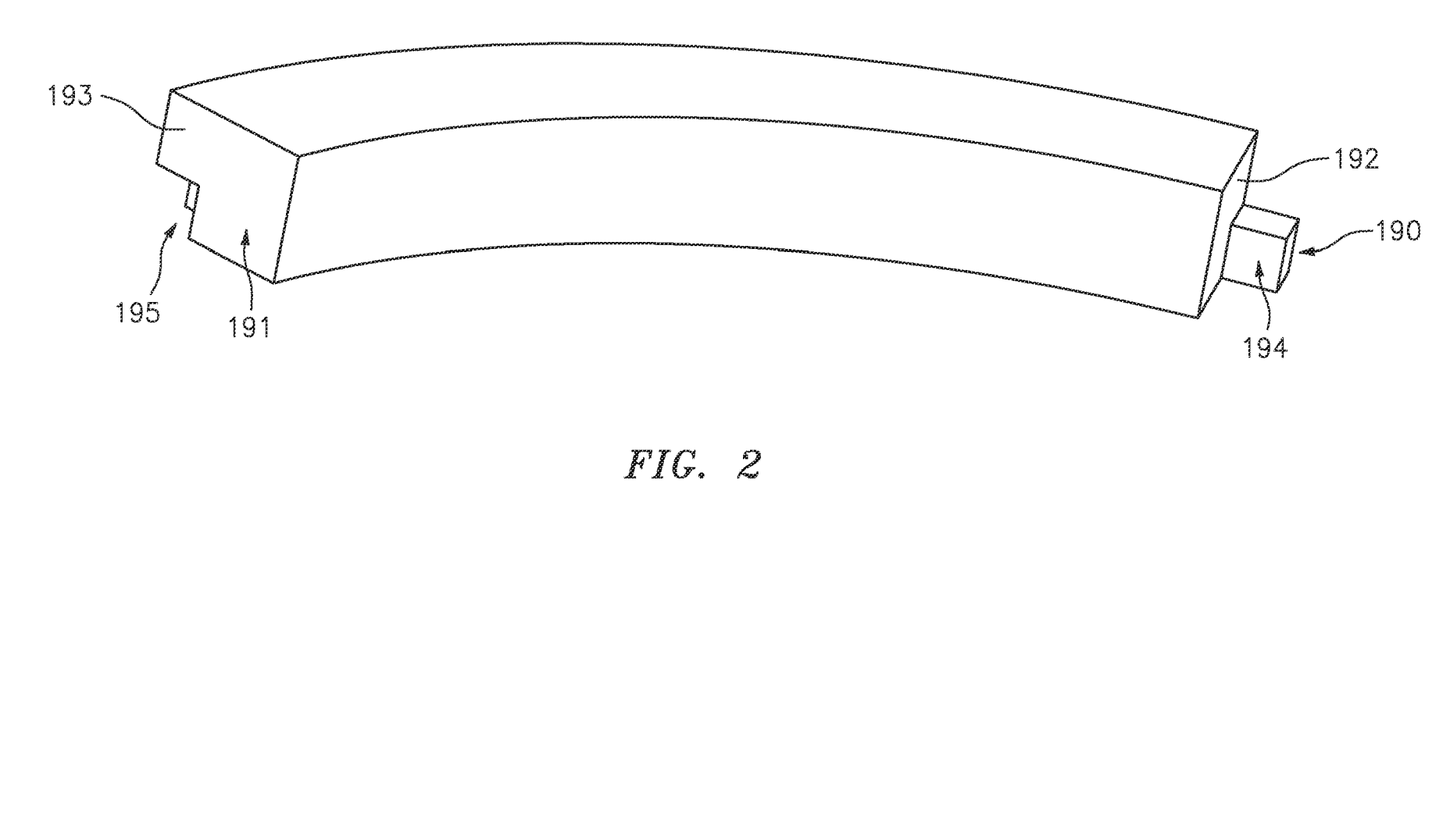
FIG. 2 is a view of a seal segment of the seal system.

FIG. 2 shows one example of segment ends for forming junctions between segments. The mating ends of seal segments may have various interfitting features such as tongue/groove or shiplap features that still provide some sealing over a range of relative segment position. An example number of segments per seal is three to twenty, more particularly, four to eight. The segments have first and second circumferential ends 190 191. The example segment ends have a generally radial/axial main face 192, 193. One end has a tongue (projection) 194 and the other end has a groove (compartment) 195 for receiving the tongue of the adjacent segment end. The exemplary tongue and groove of generally rectangular section at one corner of the generally rectangular section of the end.

The carbon seals 104, 105 are accommodated in respective compartments 172, 173 (FIG. 1A) in the first member. The example first member comprises multiple pieces. The respective fore-and-aft faces of the carbon seals are captured by associated faces of portions of the first member and the respective OD surfaces 160, 161 are captured by respective ID surface portions 180, 181.

The example seal 105 is an archbound (AB) seal wherein with its segments abutting end-to-end there is still available radial clearance with the associated runner 113. Example centered static $R_{CO}$ may be at least about 0.0010 inch (0.025 mm) for gas turbine engine use (e.g., 0.0010 to 0.010 inch (0.025 to 0.25 mm) or 0.0010 to 0.0050 inch (0.025 to 0.13 mm) or 0.0020 inch to 0.0050 inch (0.051 to 0.13 mm)). This may be in excess of ten times $R_{CI}$ if $R_{CI}$ is non zero. There may, additionally, be OD radial clearance with the first member or there may be a press/interference fit relationship with the first member. The example seal 104 is non-arch-bound so that the ID surface 106 along the various segments may simultaneously contact the associated runner 112. Thus, the inner seal 104 may have OD radial clearance with the first member.

A first piece of the example first member is a seal support such as formed by a hub structure 200 extending radially outward to the gas path (e.g., to struts or nozzles downstream of the combustor and upstream of the high pressure turbine (HPT)). Vanes or struts may pass loads from the hub through to outer static case structure.

A second piece 202 of the first member is a seal housing for the outer seal 105 and acts as an axial retainer for the inner seal 104. The example hub 200 has surfaces 180, 210 forming the OD and one radial face (axial end face) of the compartment 172. The surface 210 is along an inwardly-directed flange 212. The opposite face of the compartment 172 is formed by an end surface 214 of a flange 215 of the seal housing 202. A radially inboard portion of the surface 214 bounds the compartment 172 and a radially outboard portion abuts a shoulder of the hub.

The seal housing 202 further includes an outer sleeve section 220 having an OD surface 222 accommodated in a compartment of the hub having an ID surface 224. A portion of an ID surface of the sleeve section 220 forms the surface 181. The seal housing further includes a second flange 230 having a surface 232 forming one end of the compartment 173. A second end is formed by a retainer clip 234 having an OD portion captured in an ID groove in the seal housing. Similarly, a second clip 236 captures the seal housing 202. An annular channel between the flanges 215 and 230 forms an interstage collection plenum 606 with one or more metering orifices 240 at a radially outward base of the channel forming the plenum. The orifices meter and pass the flow 406 to a passageway 242 in the hub for ultimate disposal as discussed above.

Figure 1A:
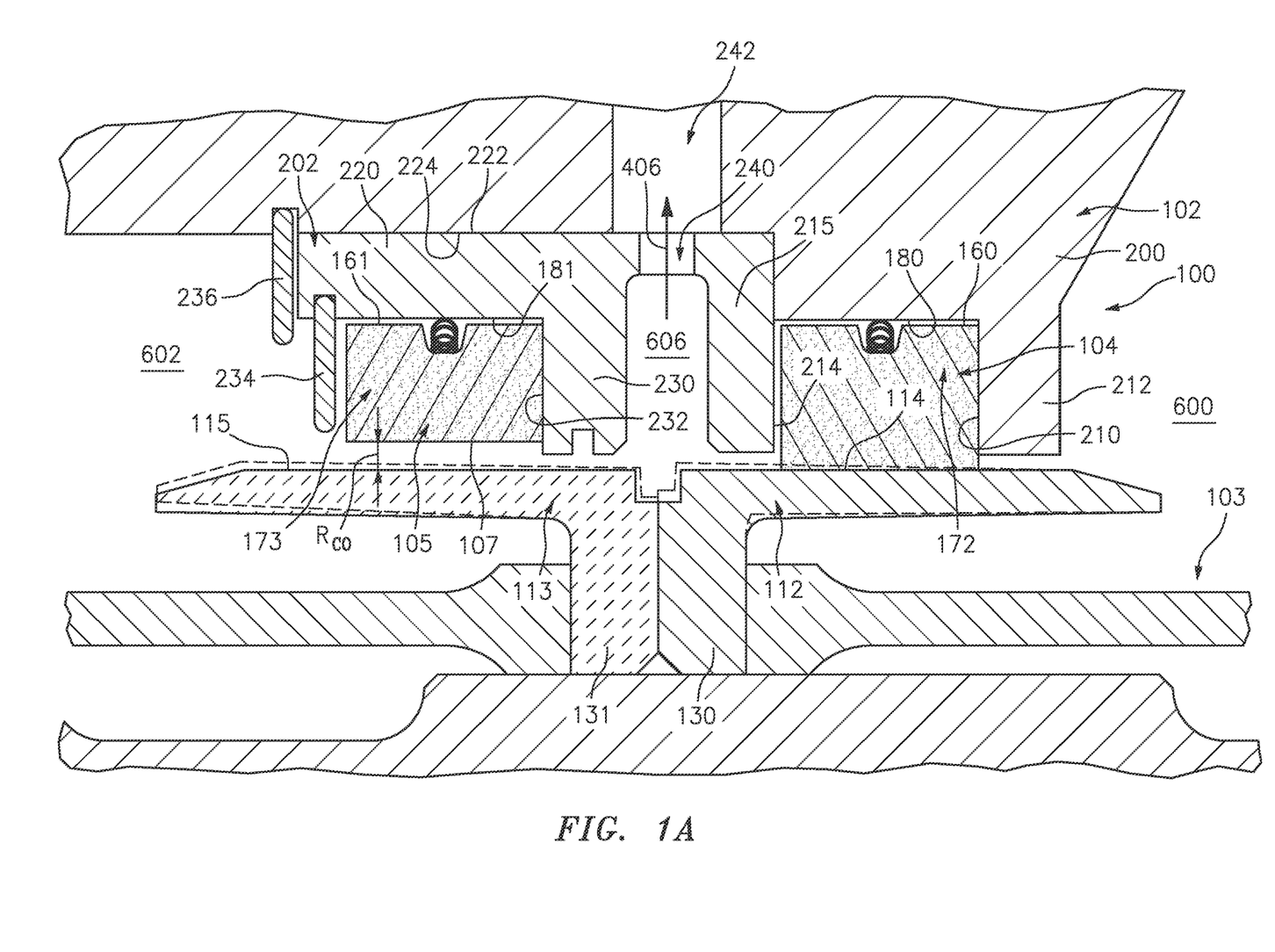
FIG. 1A is an enlarged view of the seal system of FIG. 1 showing operational deflections in broken lines.

FIG. 1A shows an in-service/operational condition of the runners and seals in broken lines. Relative to the solid line static condition, the oil side runner is shown having a thermally expanded flange.

Due to cooling from the oil spray 410 from one or more cooling outlets 128, the cantilevered portion 132 thermally contracts to counter the effect of flange thermal expansion. The result is that the cantilevered portion 132 cones inward. The use of two runners helps concentrate the oil cooling along the cantilevered portion adjacent the oil-side seal relative to an alternative longer cantilevered portion spanning both seals. In distinction, the air side runner is shown with less flange thermal expansion. But, due to the lack of active cooling, there may be an outward coning of the cantilevered portion 133.

For the oil side runner, the resultant coned state of the runner will reduce the pressure loading on the oil side seal. Reducing the pressure loading on the oil side will increase the durability of the oil side seal. From a pressure loading standpoint, the contacting carbon will experience a lower pressure if the runner cones divergently from the seal in the direction of buffer air flow (so that the surface 114 converges from proximal to distal and inward into the bearing compartment) because segments will conform to the runner during operation.

For the air side seal runner, a separate runner may reduce sensitivity to the varying ranges of speed and pressure conditions throughout the operating envelope. The thermals of the runner are directly tied to the speed and pressure conditions. Having a lower sensitivity to these parameters such as via a lower CTE material allows for a smaller range of radial gap variation. This does not need to be complemented with a separate cooling oil delivery system. This allows for better tuning of the system level impacts due to the resultant air leakage past the seal. In various implementations, compared with a baseline seal system one or both of the configuration and difference in runner materials may reduce overall runner deflections experienced by the oil-side seal while maintaining the required pressure difference.

Figure 3:
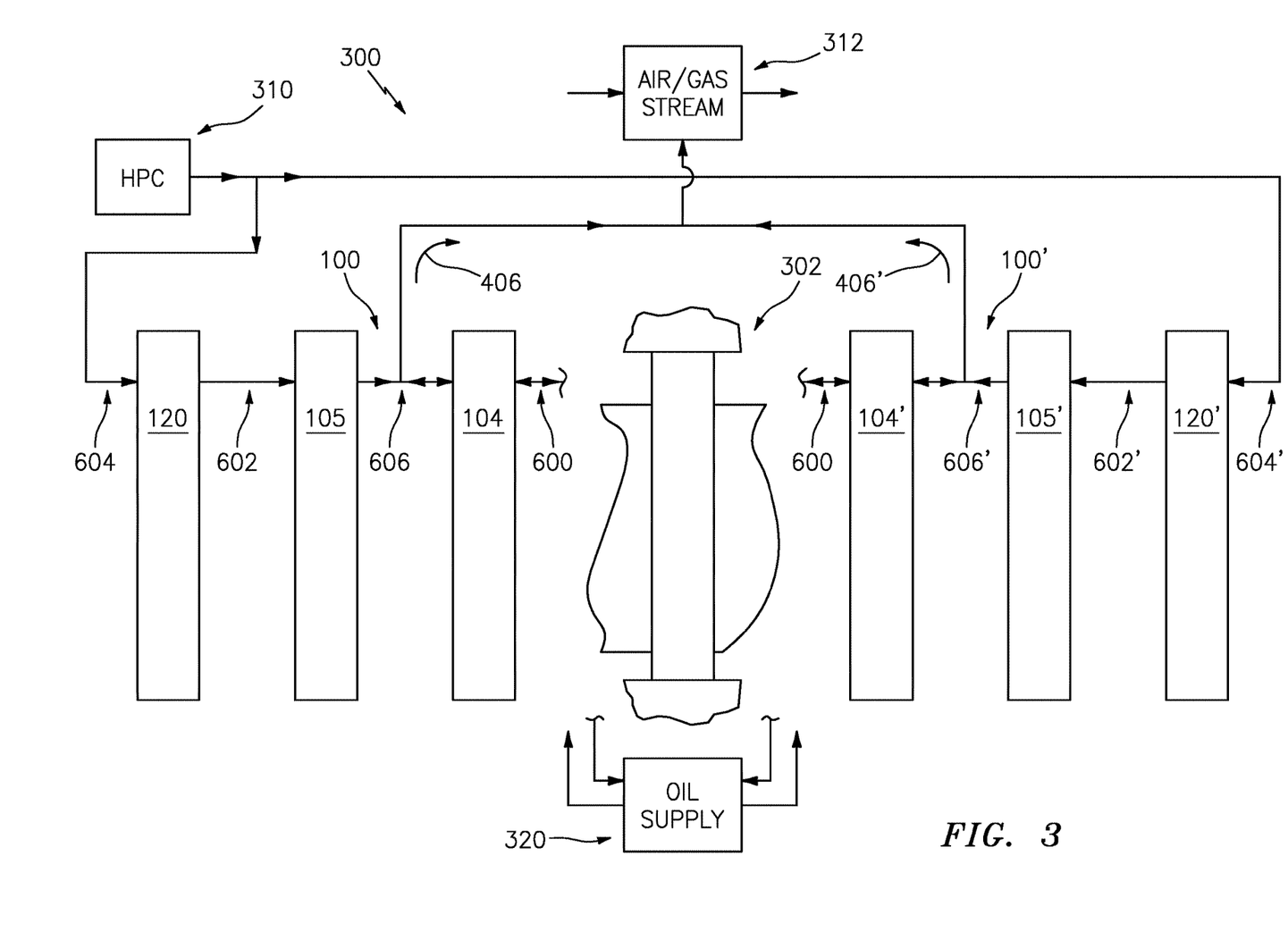
FIG. 3 is a schematic view of a buffering and scuppering system.

FIG. 3 shows a buffering and scuppering system 300 serving the bearing compartment 600 containing a bearing 302 (e.g., a rolling element bearing). Seal system 100 is to one side of the bearing compartment and a seal system 100' is opposite. The seal system 100' may be similar to the seal system 100 having similar seals 104', 105' 120', similar spaces 602', 604', 606', and similar flows and flowpaths/lines. A buffer air source 310 may be an HPC bleed as discussed above. An oil/air scuppering destination 312 may be an air/gas stream such as a return to the core flowpath at a lower pressure stage in the turbine (e.g., the low pressure turbine (LPT) or a lower pressure stage within the high pressure turbine (HPT). FIG. 3 further shows a recirculating oil supply system 320 which may include pumps, reservoirs, filters, cooling heat exchangers, and the like. The oil supply system 320 scavenges and recirculates oil for bearing lubrication/cooling and seal runner cooling.

Component manufacture and assembly techniques may be otherwise conventional. Metallic runners may be machined (e.g., on a lathe or turning machine from stock material or from a rough casting. Metallic runners may be assembled to the shaft via thermal interference fit and or inter fitting anti-rotation features such as splines (not shown). Non-metallic runners (e.g., ceramic or ceramic matrix composite (CMC) may be molded and finish machined (e.g., on a lathe or turning machine). Such non-metallic runners may have anti-rotation features mated to corresponding shaft features or corresponding features of the metallic runner or spacer (e.g., castellation features—not shown) to limit potential cracking from thermal interference.

Figure 4:
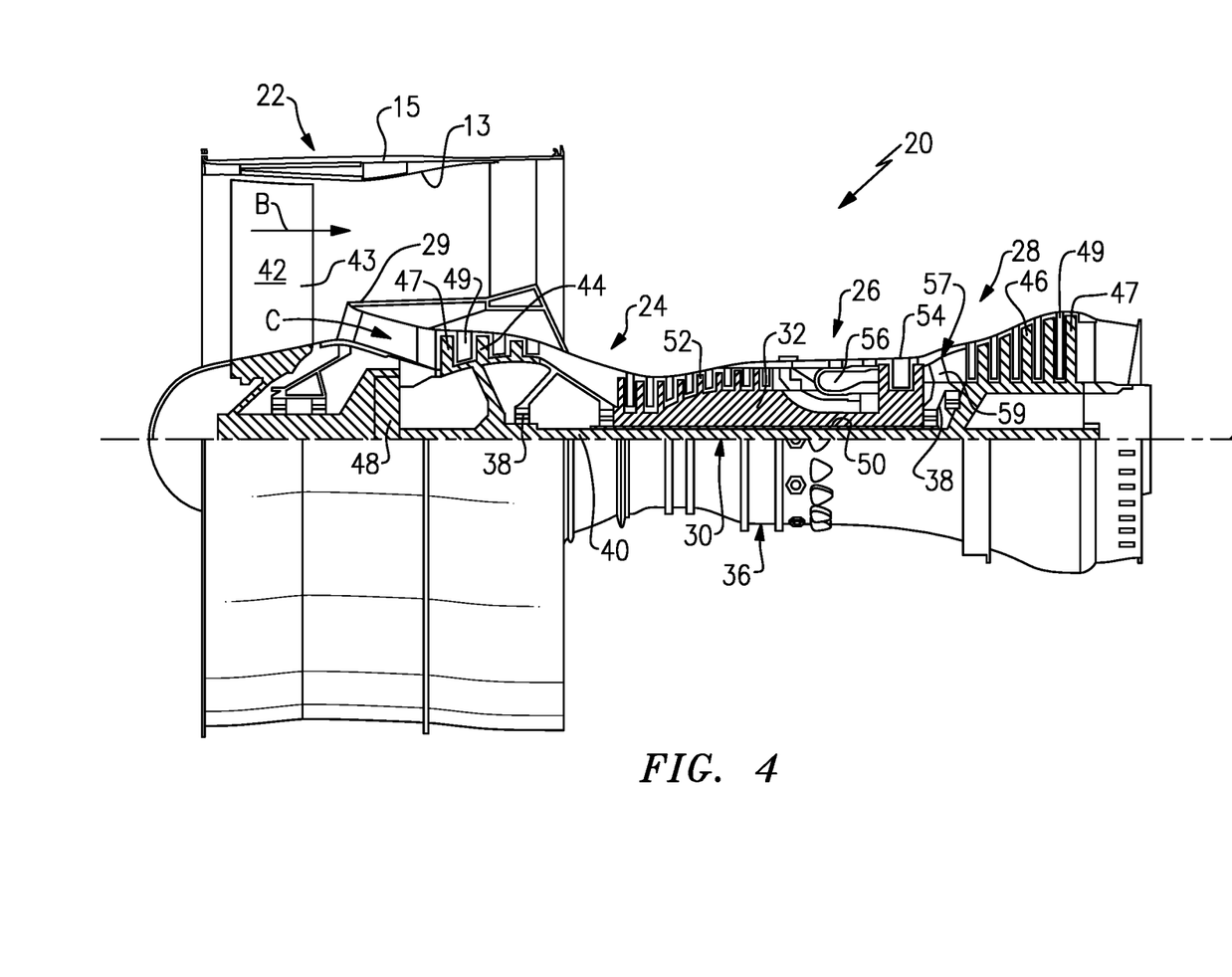
FIG. 4 is a schematic view of a gas turbine engine in which the seal system may be included.

FIG. 4 schematically illustrates a gas turbine engine 20 as one of many examples of an engine in which the seal system 100 may be used. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the example gas turbine engine 20 is illustrated as a geared architecture 48 to drive the fan 42 at a lower speed than the low speed spool 30. The inner shaft 40 may interconnect the low pressure compressor (LPC) 44 and low pressure turbine (LPT) 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor (HPC) 52 and a second (or high) pressure turbine (HPT) 54. A combustor 56 is arranged in the example gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing or new baseline engine or seal configuration, details of such baseline may influence details of particular implementations. Accordingly, other embodiments are within the scope of the following claims.

What is claimed is:

1. A turbomachine comprising:
a bearing in a bearing compartment; and
a first seal system isolating the bearing compartment and comprising:
  a first runner;
  a second runner;
  an inner seal encircling the first runner; and
  an outer seal encircling the second runner,
wherein:
  the inner seal has a static clearance with the first runner;
  the outer seal has a static clearance with the second runner, greater than the inner seal static clearance;
  the first runner comprises an inner portion cantilevered inward; and
  the second runner comprises an outer portion cantilevered outward.

2. The turbomachine of claim 1 wherein:
the inner seal static clearance is zero.

3. The turbomachine of claim 2 wherein:
the outer seal static clearance is 0.0010 inch to 0.0050 inch (0.025 to 0.13 mm) radially.

4. The turbomachine of claim 1 wherein:
the inner seal is a non-archbound seal; and
the outer seal is an archbound seal.

5. The turbomachine of claim 1 further comprising:
a circumferential spring biasing the inner seal into engagement with the first runner.

6. The turbomachine of claim 1 wherein:
the inner seal is a carbon seal; and
the outer seal is a carbon seal.

7. The turbomachine of claim 1 wherein:
the inner seal is circumferentially segmented; and
the outer seal is circumferentially segmented.

8. The turbomachine of claim 1 wherein:
the first runner comprises an inner portion cantilevered inward; and
the second runner comprises an outer portion cantilevered outward.

9. The turbomachine of claim 1 wherein:
the first runner has a mounting flange; and
the second runner has a mounting flange abutting the inner portion mounting flange.

10. The turbomachine of claim 1 wherein:
the first runner has a first coefficient of thermal expansion; and
the second runner has second coefficient of thermal expansion lower than the first coefficient of thermal expansion.

11. The turbomachine of claim 1 further comprising:
an oil source positioned to direct oil to preferentially cool the inner portion relative to the outer portion.

12. The turbomachine of claim 11 further comprising:
a buffer air source introducing air past the outer seal to an interstage.

13. The turbomachine of claim 12 further comprising:
an outlet from the interstage.

14. A method for using the turbomachine of claim 1, the method comprising:
driving rotation of a shaft carrying the first runner and the second runner; and
passing an airflow between the outer seal and the second runner to mix with an oil leakage flow in an interstage of the seal system.

15. The method of claim 14 further comprising:
directing a cooling oil flow to an inner diameter surface of the first runner inner portion.

16. The method of claim 14 wherein:
the first runner inner portion thermally deforms to cone inward in the inward direction; and
the second runner outer portion thermally deforms to cone outward in the outward direction.

17. A turbomachine comprising:
a bearing in a bearing compartment; and
a first seal system isolating the bearing compartment at one of a forward end of the bearing compartment and an aft end of the bearing compartment and comprising:
  a runner;
  an inner seal encircling the runner; and
  an outer seal encircling the runner,
wherein the runner has:
  a first piece encircled by the inner seal; and
  a second piece encircled by the outer seal.

18. The turbomachine of claim 17 wherein:
the runner first piece comprises an inner portion cantilevered inward; and
the runner second piece comprises an outer portion cantilevered outward.

19. The turbomachine of claim 18 wherein:
an oil source is positioned to direct an oil flow to an inner diameter surface of the runner first piece inner portion; and
the turbomachine lacks an oil source positioned to direct an oil flow to an inner diameter surface of the runner second piece outer portion.

20. The turbomachine of claim 17 wherein:
the runner first piece has a first coefficient of thermal expansion; and
the runner second piece has second coefficient of thermal expansion lower than the first coefficient of thermal expansion.

21. The turbomachine of claim 17 wherein:
the runner first piece comprises stainless steel; and
the runner second piece a molybdenum alloy or a ceramic.

22. A turbomachine comprising:
a bearing in a bearing compartment; and
a two-stage first seal system isolating the bearing compartment and comprising:
  a first runner;
  a second runner;
  an inner seal encircling the first runner; and
  an outer seal encircling the second runner,
wherein:
  the inner seal has a static clearance with the first runner;
  the outer seal has a static clearance with the second runner, greater than the inner seal static clearance; and
  the turbomachine includes means for preferentially cooling the first runner relative to the second runner.

* * * * *